Patented Jan. 31, 1939

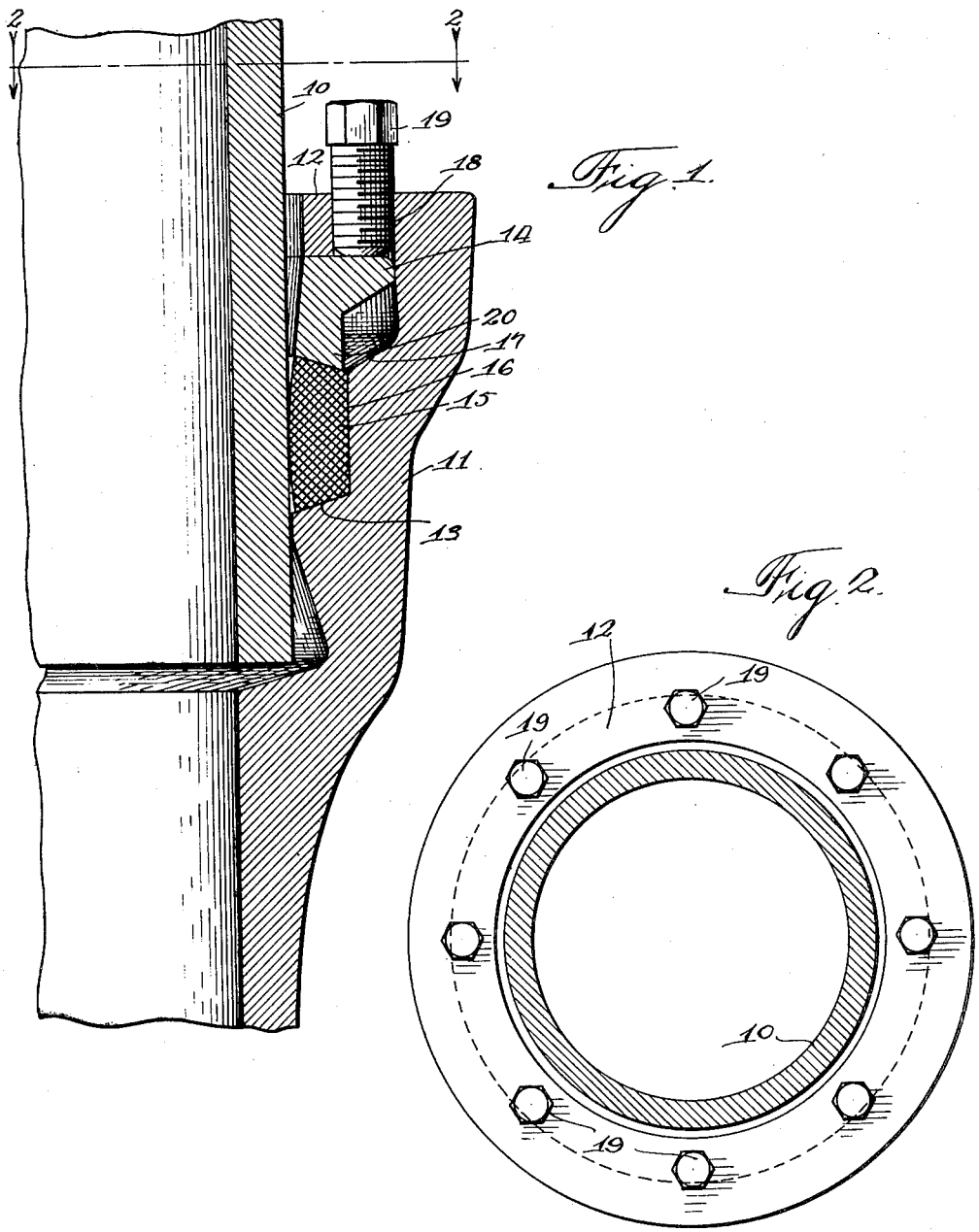

2,145,645

UNITED STATES PATENT OFFICE 2,145,645

PIPE JOINT

John A. Byers, Chicago, Ill.

Application April 26, 1937, Serial No. 138,877

5 Claims. (Cl. 285—135)

My invention relates to pipe joints and more particularly to pipe joints of the bell and spigot type, and has for an object the provision of a simple, reliable and inexpensive joint of this character.

Various bell and spigot pipe joints have heretofore been proposed which include a follower ring arranged to compress a suitable deformable member or gasket within the bell end so as to form a tight joint between the spigot and the bell. In heretofore known joints of this character, however, the follower ring constitutes a separate structure adapted to be assembled on the spigot adjacent the open end of the bell and provided with suitable clamping bolts which co-operatively engage the bell. Pipe joints of this character are necessarily costly and cumbersome due to the follower ring construction, and accordingly something is yet to be desired in a simple and reliable pipe joint which is inexpensive in its construction.

In accordance with my invention the bell end is provided with an inwardly extending flange having a plurality of threaded apertures therein and with an internal shoulder spaced from the inwardly extending flange to form a substantially closed hollow space around the spigot. Disposed in this hollow space, I provide a follower ring and a deformable member with the follower ring adjacent the inwardly extending flange for abutting engagement with threaded members which extend through the apertures in the flange. In order tightly to seal the joint between the bell and the spigot, it is necessary only to tighten up on the threaded means so as to compress the deformable member between the follower ring and the internal shoulder whereupon the deformable member tightly engages the periphery of the spigot.

More particularly, the follower ring comprises simply a solid ring of suitable material which is loosely and permanently positioned within the hollow space of the bell end by casting the bell end therearound, as, for example, by properly positioning the follower ring in the mold prior to pouring the casting, and the opposing faces of the follower ring and the internal shoulder are so formed that when the follower ring is urged toward the internal shoulder the deformable member therebetween is forced into tight engagement with the inner surface of the bell and the outer surface of the spigot.

For a more complete understanding of my invention, reference should now be had to the drawing in which Fig. 1 is a fragmentary longitudinal sectional view of a pipe joint embodying my invention; and Fig. 2 is a cross sectional view taken along the line 2—2 of Fig. 1.

Referring now to the drawing, the pipe joint shown comprises the usual spigot 10, having a uniform external diameter, and a bell 11 provided with an inwardly extending flange 12 adjacent the open end, the internal diameter of the flange being slightly greater than the diameter of the spigot so that when the bell and spigot are arranged in interfitting relation, as shown, a substantially closed hollow space is provided within the bell. Disposed within this hollow space, which is defined by the flange 12 and an internal shoulder 13 on the bell 11, is a follower ring 14 which may be formed of any suitable material.

As set forth above, the follower ring 14 is preferably a solid annular member and may be loosely positioned within the bell 11, by casting the bell therearound. For example, the ring 14 may be embedded within the sand or other suitable material from which the core is formed prior to pouring the metal from which the bell is cast. If desired, the ring 14 may consist of two or more sections to permit insertion of the ring in the hollow space after the bell is cast, suitable interlocking means being provided between the ring sections. Also disposed within the hollow space in the bell 11 I provide a deformable member or gasket 15 preferably formed of rubber, which gasket 15 is located between the ring 14 and the shoulder 13 in engagement with an internal wall 16 of the bell 11 formed by a second internal shoulder 17.

It will be apparent that whenever the follower ring 14 is urged toward the internal shoulder 13 the deformable member or gasket 15 will be compressed therebetween and so deformed as to tightly engage the wall 16 of the bell 11 and the outer surface of the spigot 10, thus providing a tightly sealed joint. In order to so urge the follower ring 14 toward the shoulder 13, the inwardly extending flange 12 is provided with a plurality of circumferentially spaced apertures 18 for co-operatively receiving threaded members or bolts 19. The innermost ends of the bolts 19 abuttingly engage the follower ring 14, and it will be apparent that it is only necessary to rotate the bolts 19 to urge the follower ring 14 in a direction to compress the gasket member 15. As shown, the ring 14 is provided with a lip portion 20 of reduced external diameter, which lip portion moves into the space between the wall 16 and the spigot 10 when the follower ring is urged toward the shoulder 13 to compress the gasket 15. Preferably, the opposing faces of the shoulder 13 and the lip portion 20 of the ring 14, which faces engage the gasket 15, are sloped, as shown, to insure that the gasket 15 when compressed will be deformed as to engage tightly the spigot 10.

I have thus provided a simple and reliable pipe joint which presents a neat appearance, which is inexpensive to construct, and in which the follower ring is permanently positioned within the bell whereby the follower ring may not become lost or misplaced.

While I have shown a particular embodiment of my invention, it will be understood that I do not wish to be limited thereto, since modifications may obviously be made, and I therefore contemplate by the appended claims to cover all such modifications as fall within the true spirit and scope of my invention.

Having thus described my invention, what I claim and desire to secure by Letters Patent is:

1. A bell and spigot pipe joint comprising a bell having an inwardly extending flange adjacent its open end and an internal shoulder spaced from said flange to form a hollow space about the interfitting spigot, a follower ring in said space adjacent said flange, a deformable member in said space between said ring and said shoulder, and means extending through said flange abuttingly engaging said follower ring within said hollow space for urging said ring toward said shoulder to compress said deformable member therebetween.

2. A bell and spigot pipe joint comprising a bell having an inwardly extending flange adjacent its open end and an internal shoulder spaced from said flange to form a hollow space about the interfitting spigot, a follower ring permanently and loosely positioned in said hollow space, a sealing ring in said space between said follower ring and said shoulder adapted to be deformed radially so as tightly to engage said bell and said spigot when compressed between said follower ring and said shoulder, and threaded means extending through said flange abuttingly engaging said follower ring for positively urging said follower ring toward said shoulder.

3. A bell and spigot pipe joint comprising a bell having an inwardly extending flange adjacent its open end and an internal shoulder spaced from said flange to form a hollow space about the interfitting spigot, said flange having a plurality of circumferentially spaced threaded apertures extending axially therethrough, a follower ring in said space adjacent said flange, a deformable packing ring between said follower ring and said shoulder, and threaded means extending through said apertures in said flange abuttingly engaging said follower ring for urging said follower ring toward said shoulder axially to compress said packing ring, whereby said packing ring is deformed to engage tightly said bell and said spigot.

4. A bell and spigot pipe joint comprising a bell having an inwardly extending flange adjacent its open end and an internal shoulder spaced from said flange to provide a hollow space about the interfitting spigot, said bell having a second internal shoulder between said flange and said first mentioned shoulder providing a portion of reduced width in said hollow space, a follower ring in said space between said flange and said second shoulder having a lip portion of reduced diameter facing said reduced portion of said space, a deformable packing ring in said reduced portion of said hollow space adjacent said first mentioned shoulder, and threaded means extending through said flange for abuttingly engaging said follower ring to urge said follower ring toward said shoulders, said lip portion of said ring and said first mentioned shoulder engaging said packing ring to compress the same in said reduced portion and thereby provide a tight seal between said bell and said spigot.

5. A bell and spigot pipe joint comprising a bell having an inwardly extending flange adjacent its open end and an internal shoulder spaced from said flange, the internal diameter of said flange being only slightly larger than the external diameter of the interfitting spigot whereby said flange and said shoulder form a substantially closed hollow space about said spigot, a follower ring permanently and loosely positioned within said space, a deformable member in said space between said ring and said shoulder and adapted to be deformed so as tightly to engage said bell and said spigot when compressed between said ring and said shoulder, and means cooperatively engaging said flange and extending therethrough for abuttingly engaging said ring, said means upon operation to urge said follower ring toward said shoulder being placed under compression.

JOHN A. BYERS.